(12) United States Patent
Zhu et al.

(10) Patent No.: US 8,704,820 B2
(45) Date of Patent: Apr. 22, 2014

(54) IMAGE DISPLAY METHOD AND IMAGE DISPLAY DEVICE

(75) Inventors: Mingdong Zhu, Shenzhen (CN); Kejun Zhang, Shenzhen (CN)

(73) Assignee: ZTE Corporation, Shenzhen, Guangdong Province (CN)

(*) Notice: Subject to any disclaimer, the term of this patent is extended or adjusted under 35 U.S.C. 154(b) by 0 days.

(21) Appl. No.: 13/383,870

(22) PCT Filed: Sep. 16, 2010

(86) PCT No.: PCT/CN2010/077011
§ 371 (c)(1),
(2), (4) Date: Jan. 13, 2012

(87) PCT Pub. No.: WO2011/137617
PCT Pub. Date: Nov. 10, 2011

(65) Prior Publication Data
US 2013/0063416 A1 Mar. 14, 2013

(30) Foreign Application Priority Data
May 5, 2010 (CN) .......................... 2010 1 0168825

(51) Int. Cl.
*G06F 17/00* (2006.01)
*G06T 1/00* (2006.01)
*G09G 1/14* (2006.01)
*G09G 3/36* (2006.01)

(52) U.S. Cl.
USPC .............................. 345/418; 345/24; 345/99

(58) Field of Classification Search
CPC .............................. G09G 2380/16; G09G 5/00
See application file for complete search history.

(56) References Cited

U.S. PATENT DOCUMENTS

| 7,158,175 | B2* | 1/2007 | Belz et al. | 348/231.3 |
| 7,362,963 | B2* | 4/2008 | Lin | 386/332 |
| 7,394,969 | B2* | 7/2008 | Sun et al. | 386/248 |
| 8,004,593 | B2* | 8/2011 | Kusaka | 348/333.02 |

(Continued)

FOREIGN PATENT DOCUMENTS

| CN | 1567337 A | 1/2005 |
| CN | 1591390 A | 3/2005 |

(Continued)

OTHER PUBLICATIONS

International Search Report for PCT/CN2010/077011 dated Jan. 17, 2011.

*Primary Examiner* — Kee M Tung
*Assistant Examiner* — Zhengxi Liu
(74) *Attorney, Agent, or Firm* — Ling Wu; Stephen Yang; Ling and Yang Intellectual Property

(57) ABSTRACT

The present invention discloses a method for displaying a picture comprising: calculating a static quality score S of a picture to be displayed based on static parameters of the picture and static parameters of a display module displaying the picture; calculating a dynamic quality score D of the picture based on dynamic parameters of the picture; calculating a quality score Score of the picture based on the static quality score S of the picture and the dynamic quality score D of the picture; calculating a display time T for displaying the picture based on the quality score Score of the picture; and the display module displaying the picture according to the display time T. The present invention further discloses a device for displaying a picture.

9 Claims, 2 Drawing Sheets

(56) References Cited

U.S. PATENT DOCUMENTS

| | | | |
|---|---|---|---|
| 2006/0170669 A1* | 8/2006 | Walker et al. | 345/418 |
| 2008/0100596 A1 | 5/2008 | Peng | |
| 2008/0183649 A1* | 7/2008 | Farahani et al. | 706/14 |
| 2008/0309652 A1* | 12/2008 | Ostlund | 345/211 |
| 2009/0195554 A1 | 8/2009 | Hu | |
| 2009/0278997 A1* | 11/2009 | Sano et al. | 348/739 |
| 2010/0023979 A1* | 1/2010 | Patel et al. | 725/93 |
| 2010/0066647 A1 | 3/2010 | Tatsuta et al. | |
| 2010/0066729 A1 | 3/2010 | Li et al. | |

FOREIGN PATENT DOCUMENTS

| | | |
|---|---|---|
| CN | 101211547 A | 7/2008 |
| CN | 101645259 A | 2/2010 |
| CN | 101833937 A | 9/2010 |

* cited by examiner

IMAGE DISPLAY METHOD AND IMAGE DISPLAY DEVICE

TECHNICAL FIELD

The present invention mainly relates to the field of picture display, and in particular, to a method and device for displaying a picture.

BACKGROUND OF THE RELATED ART

With the development and popularity of digital equipment such as digital cameras, mobile internet devices (MID), etc., terminals with the digital photo frame function gradually enters into people's daily life. People can record joyful or meaningful moments in their lives or works using digital cameras and then store photos in the terminal equipment with the digital photo frame application so as to take them as wonderful memories or share them with their friends.

The basic procedure of the typical digital photo frame application is that a user selects a picture to be displayed and sets a display time for the picture, and then an application program reads the picture from a memory and displays the picture according to a mode set by the user.

However, display times of pictures in existing terminals, such as digital photo frames, etc., are generally the fixed time intervals set in the program or time intervals that are set by the user are same for all pictures such that the display time of each picture cannot be set individually according to different picture qualities and users' preferences. Therefore, the users cannot have better experience in this respect.

CONTENT OF THE INVENTION

The present invention discloses a method and device for displaying a picture so as to calculate different display time based on static parameters and dynamic parameters of different pictures and individually set the display time of each picture based on different parameters, such as picture quality, etc.

The technical scheme of the present invention is implemented as follow.

The present invention provides a method for displaying a picture comprising:

calculating a static quality score S of a picture to be displayed based on static parameters of the picture and static parameters of a display module displaying the picture;

calculating a dynamic quality score D of the picture based on dynamic parameters of the picture;

calculating a quality score Score of the picture based on the static quality score S of the picture and the dynamic quality score D of the picture;

calculating a display time T for displaying the picture based on the quality score Score of the picture; and the display module displaying the picture according to the display time T.

Preferably, the static parameters of the picture include a resolution of the picture and a length to width ratio of the picture;

the static parameters of the display module include a resolution of the display module and a length to width ratio of the display module; and the dynamic parameters of the picture include the number of days for storing the picture, the number of times of browsing the picture individually and the number of times of using the picture.

Preferably, the static quality score S of the picture is calculated through the following formula:

$$S=(R1/R2)*M+\{1-|LD1-LD2|/(LD1+LD2)\}*N;$$

where the R1 represents a pixel of the picture, the R2 represents a pixel of the display module displaying the picture, LD1 represents the length to width ratio of the picture, LD2 represents the length to width ratio of the display module displaying the picture, and M and N are greater than 0.

Preferably, the dynamic quality score D of the picture is calculated through the following formula:

$$D=\text{the number of days for storage}/A+\text{the number of times of using}/B+\text{the number of times of individual browsing}/C;$$

where the A, B and C are numbers greater than 0.

Preferably, the display time T for displaying the picture is calculated through the following formula:

if MaxScore does not equal to MinScore, then:

$$T=\text{Min\_Time}+(\text{Score}-\text{MinScore})/(\text{MaxScore}-\text{MinScore})*(\text{Max\_Time}-\text{Min\_Time});$$

if MaxScore equals to MinScore, then: $T=\frac{1}{2}*(\text{Max\_Time}+\text{Min\_Time})$;

where the MaxScore refers to a maximum value in quality score Score values of all pictures, the MinScore refers to a minimum value in the quality score Score values of all pictures, the Score=S+D, the Max_Time refers to a maximum time for displaying the picture, and the Min_Time refers to a minimum time for displaying the picture.

Preferably, after the quality score Score of the picture is calculated, the method further comprises:

readjusting the quality score Score of the picture according to a user's preference and selection.

The present invention provides a device for displaying a picture comprising:

a static quality analysis module configured to calculate a static quality score S of a picture to be displayed based on static parameters of the picture and static parameters of a display module displaying the picture;

a dynamic quality analysis module configured to calculate a dynamic quality score D of the picture based on dynamic parameters of the picture;

a calculation module configured to calculate a quality score Score of the picture based on the static quality score S of the picture and the dynamic quality score D of the picture;

a comprehensive processing module configured to calculate a display time T for displaying the picture based on the quality score Score of the picture; and a display module configured to display the picture according to the display time T.

Preferably, the static parameters of the picture include a resolution of the picture and a length to width ratio of the picture;

the static parameters of the display module include a resolution of the display module and a length to width ratio of the display module; and the dynamic parameters of the picture include the number of days for storing the picture, the number of times of browsing the picture individually and the number of times of using the picture.

Preferably, the static quality analysis module calculates the static quality score S of the picture through the following formula:

$$S=(R1/R2)*M+\{1-|LD1-LD2|/(LD1+LD2)\}*N;$$

where the R1 represents a pixel of the picture, the R2 represents a pixel of the display module displaying the picture, LD1 represents the length to width ratio of the picture, LD2 represents the length to width ratio of the display module displaying the picture, and M and N are greater than 0;

the dynamic quality analysis module calculates the dynamic quality score D of the picture through the following formula:

$$D = \text{the number of days for storage}/A + \text{the number of times of using}/B + \text{the number of times of individual browsing}/C;$$

where the A, B and C are numbers greater than 0;

the calculation module calculates the quality score Score of the picture through the following formula:

$$\text{Score} = S + D.$$

Preferably, the comprehensive processing module calculates the display time T for displaying the picture through the following formula:

if MaxScore does not equal to MinScore, then:

$$T = \text{Min\_Time} + (\text{Score} - \text{MinScore})/(\text{MaxScore} - \text{MinScore})*(\text{Max\_Time} - \text{Min\_Time});$$

if MaxScore equals to MinScore, then: $T = \frac{1}{2}*(\text{Max\_Time} + \text{Min\_Time})$;

where the MaxScore refers to a maximum value in quality score Score values of all pictures, the MinScore refers to a minimum value in the quality score Score values of all pictures, the Score=S+D, the Max_Time refers to a maximum time for displaying the picture, and the Min_Time refers to a minimum time for displaying the picture.

The technical scheme of the present invention can calculate different display time based on static parameters and dynamic parameters of different pictures such that the display time of each picture can be set individually according to different picture qualities so as to bring better use experience.

BRIEF DESCRIPTION OF DRAWINGS

In order to illustrate the technical scheme in accordance with embodiments of the present invention more clearly, the accompanying drawings required to be used in the description of the embodiments are described briefly below. Obviously, the accompanying drawings described below are only some embodiments of the present invention. It is apparent to those skilled in the art that from these accompanying drawings, other accompanying drawings may be obtained without paying out creative work.

PREFERRED EMBODIMENTS OF THE PRESENT INVENTION

The technical scheme in accordance with the embodiments of the present invention is described clearly and completely in conjunction with the accompanying drawings in the embodiments of the present invention hereinafter. Obviously, the described embodiments are only some not all embodiments of the present invention. Based on the embodiments of the present invention, all other embodiments obtained by those skilled in the art without paying out creative work belong to the protect scope of the present invention.

Figure 1:
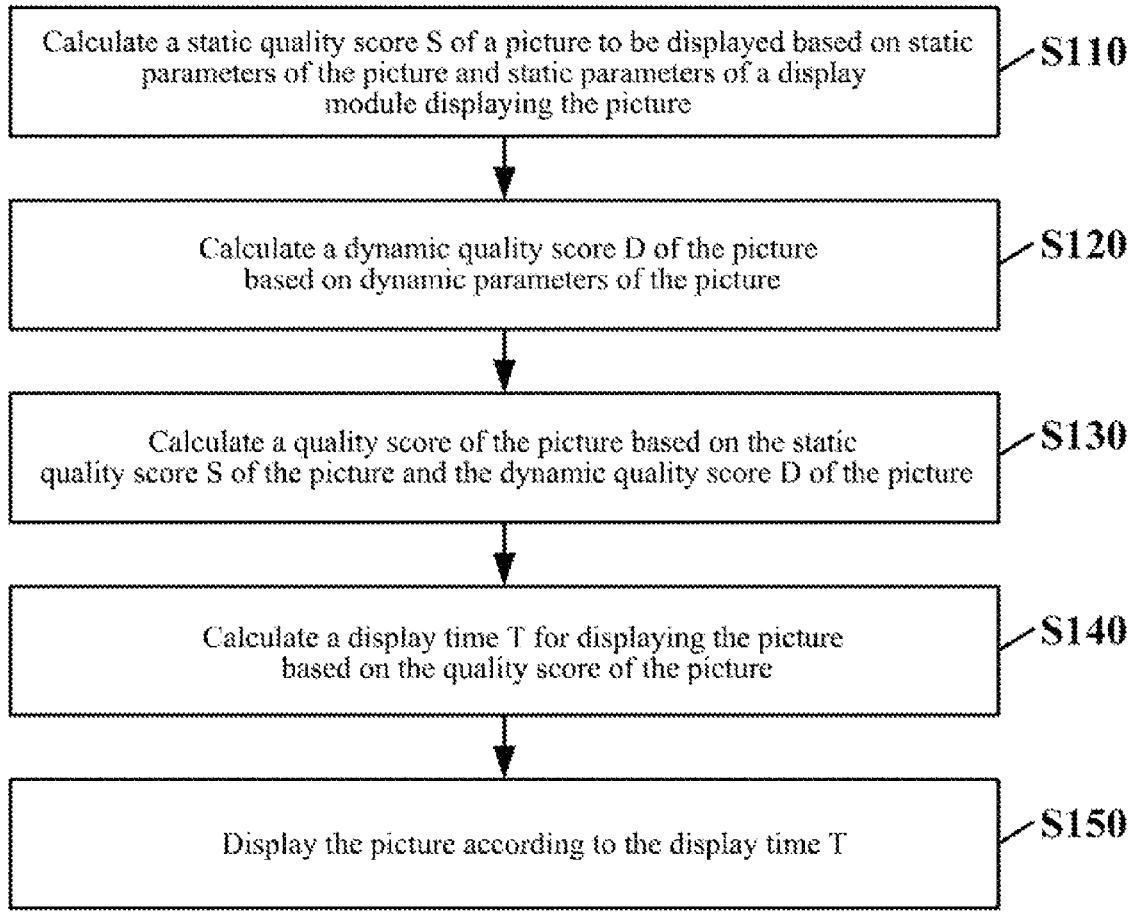
FIG. 1 is a flow chart of a method for displaying a picture according to the first embodiment of the present invention.

Referring to FIG. 1, a flow chart of a method for displaying a picture according to the first embodiment of the present invention is shown, which includes the following steps.

Step S110, a static quality score S of a picture to be displayed is calculated based on static parameters of the picture and static parameters of a display module displaying the picture.

The static quality score S can represent the static quality of the picture and the degree of adaptation of the picture to the display module.

The static parameters of the picture are used for reflecting fixed properties of the picture, while the static parameters of the display module are used for reflecting fixed properties of the display module.

In a preferred embodiment of the present invention, the static parameters of the picture include the resolution of the picture and the length to width ratio of the picture.

The static parameters of the display module include the resolution of the display module and the length to width ratio of the display module.

Of course, the static parameters, in addition to the resolution and the length to width ratio, can further include other various parameters which can reflect the fixed properties of the picture and the display module, such as the model and parameter of the camera taking the picture, etc.

The length to width ratio of the picture can be obtained based on the resolution of the picture, for example, if the resolution of a certain picture is 800*600, then the length to width ratio of the picture is 800/600. Similarly, the length to width ratio of the display module can also be obtained based on the resolution of the display module, for example, if the resolution of a certain display module is 1024*768, then the length to width ratio of the display module is 1024/768.

In a preferred embodiment of the present invention, the static quality score S of the picture to be displayed is calculated based on the static parameters of the picture and the static parameters of the display module displaying the picture through the following formula:

$$S = (R1/R2)*M + \{1 - |LD1 - LD2|/(LD1 + LD2)\}*N;$$

The R1 represents a pixel of the picture, the R2 represents a pixel of the display module displaying the picture, LD1 represents the length to width ratio of the picture, LD2 represents the length to width ratio of the display module displaying the picture, and M and N are greater than 0 respectively. In the embodiment of the present invention, the M is preferably 5 and N is preferably 10. Of course, it can be understood by those skilled in the art that the M and N may be other values, for example, M is 10, N is 20 or other values, which is not limited by the present invention.

Step S120, a dynamic quality score D of the picture is calculated based on the dynamic parameters of the picture.

The dynamic parameters are used for reflecting variable properties of the picture.

In a preferred embodiment of the present invention, the dynamic parameters of the picture include the number of days for storing the picture, the number of times of browsing the picture individually and the number of times of using the picture.

Of course, the dynamic parameters, in addition to the number of days for storing the picture, the number of times of browsing the picture individually and the number of times of using the picture, may further include other various parameters which can reflect the dynamic properties of the picture.

In a preferred embodiment of the present invention, the dynamic quality score D of the picture is calculated based on the dynamic parameters of the picture through the following formula:

$$D = \text{the number of days for storage}/A + \text{the number of times of using}/B + \text{the number of individual browsing}/C;$$

where the A, B and C are numbers greater than 0. In the embodiments of the present invention, the A is preferably 1, the B is preferably 3 and the C is preferably 5. Of course, the A, B and C may also be other values, for example, A is 2, B is 5, C is 8 or other values, which is not limited by the present invention.

The initial value of the dynamic quality score D may be 0. Whenever the picture is individually browsed for 5 times, the dynamic quality score D corresponding to the picture is added by 1. The formula of calculating the new D based on the number of times of browsing the picture individually is:

$$D(\text{new}) = D(\text{original}) + \text{the number of times of individual browsing}/5$$

Whenever the picture is used by other applications for 3 times, the D corresponding to the picture is added by 1. The formula of calculating the D based on the number of times of using the picture by other applications is: D (new)=D (original)+the number of times of using by other applications/3.

Whenever the picture is stored in the memory for 1 day, the D corresponding to the picture is added by 1. The formula of calculating the new dynamic quality score D based on the number of days for storing the picture is: D (new)=D (original)+the number of days for storage (taking day a unit).

In this embodiment, the dynamic quality score D is calculated based on these three parameters, the number of days for storing the picture, the number of times of browsing the picture individually and the number of times of using the picture. It can be understood by those skilled in the art that the dynamic quality score D can further be calculated based on any one of the parameters, which is not limited by the present invention.

Step S130, a quality score Score of the picture is calculated based on the static quality score S of the picture and the dynamic quality score D of the picture.

The quality score Score of the picture can be calculated based on the following formula:

$$\text{quality score Score} = \text{static quality score } S + \text{dynamic quality score } D.$$

Step S140, a display time T for displaying the picture is calculated based on the quality score Score of the picture.

The display time T for displaying the picture can be calculated based on the following formula:
if MaxScore does not equal to MinScore, then:

$$T = \text{Min\_Time} + (\text{Score} - \text{MinScore})/(\text{MaxScore} - \text{MinScore}) * (\text{Max\_Time} - \text{Min\_Time}).$$

If MaxScore equals to MinScore, then:

$$T = \tfrac{1}{2} * (\text{Max\_Time} + \text{Min\_Time}),$$

where MaxScore refers to the maximum value in quality score Score values of all pictures, and MinScore refers to the minimum value in the quality score Score values of all pictures, the Score=S+D, the Max_Time refers to the maximum time for displaying the picture, and the Min_Time refers to the minimum time for displaying the picture. The Max_Time and the Min_Time are normally set by a user. If they are not set by the user, then the default value may be used, for example, Max_Time=8 seconds and Min_Time=2 seconds.

Step S150, the picture is displayed according to the display time T.

The display module displays the picture according to the display time T. When the display module displays the picture, the display time of the picture is T, and the display module will display another picture after the displaying time T passes.

In another embodiment of the present invention, after the quality score Score of the picture is calculated in the step S130, the method may further include the following step.

Step S131, the quality score Score of the picture is readjusted according to the user's preference and selection.

In some environments, the user's preference for a certain picture changes, and the preference for the picture can be manually set. Preference options of the picture normally may be set as {"general", "medium", "like"}, etc. If the user selects "general", then the quality score Score of the corresponding picture may be readjusted to be 0; if "medium" is set, then the Score of the corresponding picture may be adjusted to be (MinScore+MaxScore)/2; if "like" is set, then the Score of the corresponding picture may be adjusted to be MaxScore. The MinScore is the minimum value in Score values of all pictures, and the MaxScore is the maximum value in the Score values of all pictures. At this point, the dynamic quality score value of the corresponding picture is the new Score value minus the static quality score S of the corresponding picture.

The technical scheme of the present invention can calculate different display time based on static parameters and dynamic parameters of different pictures such that the display time of each picture can be set individually according to different picture qualities so as to bring better use experience.

The technical scheme of the present invention is further described in detail in conjunction with several embodiments hereafter.

Embodiment 1

Assuming that the display screen resolution is 800*600; 3 pictures, pic1, pic2 and pic3, are stored in a memory of a terminal, and the resolutions of the 3 pictures are 1024*768, 60*40 and 800*600 respectively; their storage time is 2 days, 4 days and 2 days respectively; pic1 is used 5 times by a screensaver program, pic2 is used 10 times by a multimedia message program and pic3 is used 4 times by a desktop wallpaper; pic1 is individually browsed 11 times, pic2 is individually browsed 3 times and pic3 is individually browsed 8 times; the Min_Time=2 s, Max_Time=6 s, as set by the user.

Step 1, the static quality score S of each picture is calculated separately as follows:
the static quality score of pic1:

$$S1 = (1024*768/800*600)*5 + \{1 - |1024/768 - 800/600|/(1024/768 + 800/600)\}*10 = 8 + 10 = 18;$$

the static quality score of pic2:

$$S2 = (60*40/800*600)*5 + \{1 - |60/40 - 800/600|(60/40 + 800/600)\}*10 = 0 + 10 = 10; \text{ and}$$

the static quality score of pic3:

$$S3 = (800*600/800*600)*5 + \{1 - |800/600 - 800/600|/(800/600 + 800/600)\}*10 = 5 + 10 = 15.$$

Step 2, the influence of the storage time of the picture on the dynamic quality score D of each picture is calculated (assuming that the initial value of the dynamic quality score D corresponding to each picture is 0) as follows:

$$D1 \text{ of pic1} = 0 + 2 = 2;$$

$$D2 \text{ of pic2} = 0 + 4 = 4; \text{ and}$$

$$D3 \text{ of pic3} = 0 + 2 = 2.$$

Step 3, the influence of the number of times of using the picture by other applications on the dynamic quality score D of each picture is calculated as follows:

$D1$ of pic1=$D1$ (step 2)+5/3=3;

$D2$ of pic2=$D2$ (step 2)+10/3=7; and $D3$ of pic3=$D3$ (step 2)+4/3=3.

Step 4, the influence of the number of times of browsing the picture individually on the dynamic quality score D of each picture is calculated as follows:

$D1$ of pic1=$D1$ (step 3)+11/5=3;

$D2$ of pic2=$D2$ (step 3)+3/5=7; and $D3$ of pic3=$D3$ (step 3)+8/5=4.

Step 5, the quality score Score value of each picture is as follows:

Score1 of pic1=18+5=23;

Score2 of pic2=10+7=17; and

Score3 of pic3=15+4=19.

Step 6, assuming that in this embodiment the user does not manually set his/her preference for the picture, the display time T of each picture is calculated separately:

$T1$ of pic1=2+(23−17)/(23−17)*(6−2)=6(s);

$T2$ of pic2=2+(17−17)/(23−17)*(6−2)=2(s); and $T3$ of pic3=2+(19−17)/(23−17)*(6−2)=3(s).

Embodiment 2

In Embodiment 1, the display time of each picture is analyzed based on objective factors of each picture. If the user's preference for a certain picture changes after a period of time, then the user can manually set his/her preference for the picture to change the display time of the corresponding picture. For example, the user sets his/her preference for the pic2 in the embodiment 1 to be "like", and then Score2 of pic2=maxScore=23, and D2 of pic2=Score−S=23−10=13.

Then the display time T of each picture is:

$T1$ of pic1=2+(23−17)/(23−17)*(6−2)=6(s);

$T2$ of pic2=2+(23−17)/(23−17)*(6−2)=6(s); and $T3$ of pic3=2+(19−17)/(23−17)*(6−2)=3(s).

Embodiment 3

If the user newly adds some pictures into the equipment after a period of time, at which point D values of the new pictures are 0. In the case that their picture qualities are not especially prominent, Score values of the pictures are relatively small, that is, their display time will be relatively short. In this case, the user can change the display time of the pictures by setting his/her preferences for the pictures.

Assuming that on the basis of Embodiment 1, the user newly adds a picture pic4, the resolution of which is 600*480. The user set his/her preference for pic4 to be "medium".

Then the static quality score of pic4 is:

$S4=(600*480/800*600)*5+\{1−|600/480−800/600|/(600/480+800/600)\}*10=3+10=13$.

The quality score of pic4 is:

Score4=½*(MaxScore+MinScore)=½*(17+23)=20, meanwhile, the dynamic quality score of pic4 is D4=20−13=7; then T4 of pic4=2+(20−17)/(23−17)*(6−2)=4(s).

Figure 2:
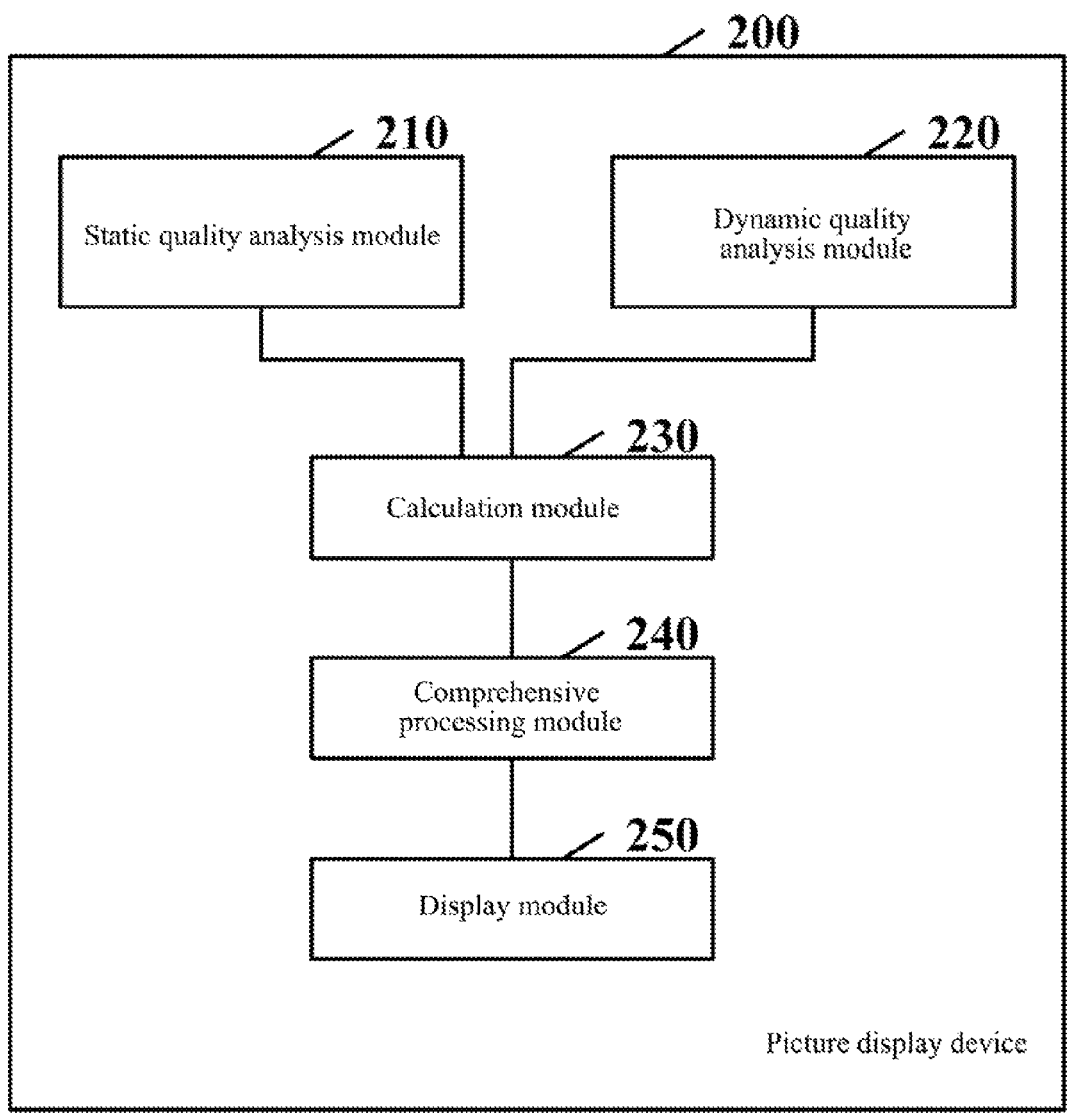
FIG. 2 is a block diagram of a device for displaying a picture according to the first embodiment of the present invention.

Referring to FIG. 2, a block diagram of a device for displaying a picture according to the first embodiment of the present invention is shown. The picture display device 200 comprises:

a static quality analysis module 210 configured to calculate a static quality score S of a picture to be displayed based on static parameters of the picture and static parameters of a display module displaying the picture, the static parameters of the picture being used for reflecting fixed properties of the picture, and the static parameters of the display module being used for reflecting fixed properties of the display module;

a dynamic quality analysis module 220 configured to calculate a dynamic quality score D of the picture based on dynamic parameters of the picture, the dynamic parameters of the picture being used for reflecting variable properties of the picture; and a calculation module 230 configured to calculate a quality score Score of the picture based on the static quality score S of the picture and the dynamic quality score D of the picture.

The calculation module 230 may be a processor carried by the picture display device 200 itself, or an additional chip configured to implement the function of the calculation module 230.

The picture display device 200 further comprises:

a comprehensive processing module 240 configured to calculate a display time T for displaying the picture based on the quality score Score of the picture; and a display module 250 configured to display the picture according to the display time T.

The static parameters of the picture include the resolution of the picture and the length to width ratio of the picture.

The static parameters of the display module 250 include the resolution of the display module 250 and the length to width ratio of the display module 250. The dynamic parameters of the picture include the number of days for storing the picture, the number of times of browsing the picture individually and the number of times of using the picture.

The static quality score S of the picture is calculated by the static quality analysis module 210 through the following formula:

$S=(R1/R2)*M+\{1−|LD1−LD2|/(LD1+LD2)\}*N;$ where the R1 represents a pixel of the picture, the R2 represents a pixel of the display module 250 displaying the picture, LD1 represents the length to width ratio of the picture, LD2 represents the length to width ratio of the display module 250 displaying the picture, and M and N are greater than 0. In the embodiment of the present invention, the M is preferably 5 and N is preferably 10. Of course, it can be understood by those skilled in the art that the M and N may be other values, for example, M is 10, N is 20 or other values, which is not limited by the present invention.

The dynamic quality score D of the picture is calculated by the dynamic quality analysis module 220 through the following formula:

D=the number of days for storage/A+the number of times of using/B+the number of times of individual browsing/C, where the A, B and C are numbers greater than 0. In the embodiments of the present invention, the A is preferably 1, the B is preferably 3 and the C is preferably 5. Of course, the A, B and C may also be other values, for example, A is 2, B is 5, C is 8 or other values, which is not limited by the present invention.

The quality score Score of the picture is calculated by the calculation module 230 through the following formula:

$$Score = S + D.$$

The display time T for displaying the picture is calculated by the comprehensive processing module 240 through the following formula:

if MaxScore does not equal to MinScore, then:

$$T = Min\_Time + (Score - MinScore)/(MaxScore - MinScore) * (Max\_Time - Min\_Time);$$

if MaxScore equals to MinScore, then:

$$T = \frac{1}{2} * (Max\_Time + Min\_Time),$$

where the MaxScore refers to the maximum value in quality score Score values of all pictures, and the MinScore refers to the minimum value in the quality score Score values of all pictures. The Max_Time refers to the maximum time for displaying the picture, and the Min_Time refers to the minimum time for displaying the picture.

The picture display device in accordance with the present invention may be a digital photo frame, an MID or other terminal with the picture display function, such as a computer, etc.

It can be understood by those skilled in the art that the embodiment of the device is corresponding to the embodiment of the method. The work process and work principle of each component of the device has already been described in detail in the embodiment of the method and, considering the length of the present application, will not be repeated here. The parts not described in detail in the embodiment of the device may be referred to the description of the related parts in the embodiment of the method.

It can be understood by those skilled in the art that in each embodiment of the method in accordance with the present invention, the serial numbers of the steps are not intended to limit the sequence of the steps. It is apparent to those skilled in the art that changes to the sequence of the steps without paying out creative work may be covered within the protection scope of the present invention.

The above description is only the preferred embodiments of the present invention and is not intended to limit the present invention. Any modification, equivalent substitution and/or variation made within the spirit and principle of the present invention should be covered within the protection scope of the present invention.

What we claim is:

1. A method for displaying a picture comprising:
    calculating a static quality score S of a picture to be displayed based on static parameters of the picture and static parameters of a display module displaying the picture;
    calculating a dynamic quality score D of the picture based on dynamic parameters of the picture;
    calculating a quality score Score of the picture based on the static quality score S of the picture and the dynamic quality score D of the picture;
    calculating a display time T for displaying the picture based on the quality score Score of the picture; and
    the display module displaying the picture according to the display time T;
    wherein the static parameters of the picture include a resolution of the picture and a length to width ratio of the picture;
    the static parameters of the display module include a resolution of the display module and a length to width ratio of the display module; and
    the dynamic parameters of the picture include the number of days for storing the picture, the number of times of browsing the picture individually and the number of times of using the picture.

2. The method according to claim 1, wherein the static quality score S of the picture is calculated through the following formula:

$$S = (R1/R2) * M + \{1 - |LD1 - LD2|/(LD1 + LD2)\} * N;$$

where the R1 represents a pixel of the picture, the R2 represents a pixel of the display module displaying the picture, LD1 represents the length to width ratio of the picture, LD2 represents the length to width ratio of the display module displaying the picture, and M and N are greater than 0.

3. The method according to claim 1, wherein the dynamic quality score D of the picture is calculated through the following formula:

$$D = \text{the number of days for storage}/A + \text{the number of times of using}/B + \text{the number of times of individual browsing}/C;$$

where the A, B and C are numbers greater than 0.

4. The method according to claim 1, wherein the display time T for displaying the picture is calculated through the following formula:

if MaxScore does not equal to MinScore, then:

$$T = Min\_Time + (Score - MinScore)/(MaxScore - MinScore) * (Max\_Time - Min\_Time);$$

if MaxScore equals to MinScore, then: $T = 1/2 * (Max\_Time + Min\_Time)$;

where the MaxScore refers to a maximum value in quality score Score values of all pictures, the MinScore refers to a minimum value in the quality score Score values of all pictures, the Score=S+D, the Max_Time refers to a maximum time for displaying the picture, and the Min_Time refers to a minimum time for displaying the picture.

5. The method according to claim 1, wherein after the quality score Score of the picture is calculated, the method further comprises:
    readjusting the quality score Score of the picture according to a user's preference and selection.

6. A device for displaying a picture comprising:
    a static quality analysis module, a display module, a dynamic quality analysis module, a calculation module and a comprehensive processing module, wherein each above module comprises at least one processor or chip;
    the static quality analysis module is configured to calculate a static quality score S of a picture to be displayed based on static parameters of the picture and static parameters of a display module displaying the picture;
    the dynamic quality analysis module is configured to calculate a dynamic quality score D of the picture based on dynamic parameters of the picture;
    the calculation module is configured to calculate a quality score Score of the picture based on the static quality score S of the picture and the dynamic quality score D of the picture;
    the comprehensive processing module is configured to calculate a display time T for displaying the picture based on the quality score Score of the picture; and
    the display module is configured to display the picture according to the display time T;
    wherein the static parameters of the picture include a resolution of the picture and a length to width ratio of the picture;

the static parameters of the display module include a resolution of the display module and a length to width ratio of the display module; and the dynamic parameters of the picture include the number of days for storing the picture, the number of times of browsing the picture individually and the number of times of using the picture.

7. The device according to claim 6, wherein the static quality analysis module calculates the static quality score S of the picture through the following formula:

$$S=(R1/R2)*M+\{1-|LD1-LD2|/(LD1+LD2)\}*N;$$

where the R1 represents a pixel of the picture, the R2 represents a pixel of the display module displaying the picture, LD1 represents the length to width ratio of the picture, LD2 represents the length to width ratio of the display module displaying the picture, and M and N are greater than 0;

the dynamic quality analysis module calculates the dynamic quality score D of the picture through the following formula:

$$D=\text{the number of days for storage}/A+\text{the number of times of using}/B+\text{the number of times of individual browsing}/C;$$

where the A, B and C are numbers greater than 0;
the calculation module calculates the quality score Score of the picture through the following formula:

$$Score=S+D.$$

8. The device according to claim 6, wherein the dynamic quality analysis module calculates the dynamic quality score D of the picture through the following formula:

$$D=\text{the number of days for storage}/A+\text{the number of times of using}/B+\text{the number of times of individual browsing}/C;$$

where the A, B and C are numbers greater than 0;
the calculation module calculates the quality score Score of the picture through the following formula:

$$Score=S+D.$$

9. The device according to claim 6, wherein the comprehensive processing module calculates the display time T for displaying the picture through the following formula:

if MaxScore does not equal to MinScore, then:

$$T=\text{Min\_Time}+(Score-MinScore)/(MaxScore-MinScore)*(Max\_Time-Min\_Time);$$

if MaxScore equals to MinScore, then: $T=1/2*(Max\_Time+Min\_Time)$;

where the MaxScore refers to a maximum value in quality score Score values of all pictures, the MinScore refers to a minimum value in the quality score Score values of all pictures, the Score=S+D, the Max_Time refers to a maximum time for displaying the picture, and the Min_Time refers to a minimum time for displaying the picture.

* * * * *